No. 768,283. PATENTED AUG. 23, 1904.
J. JENKINS.
EXPANSION BOLT.
APPLICATION FILED DEC. 7, 1903.
NO MODEL.
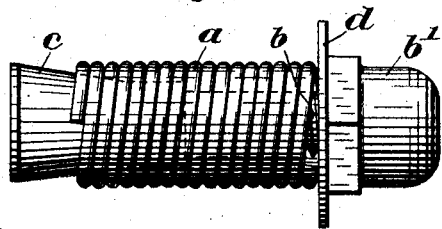
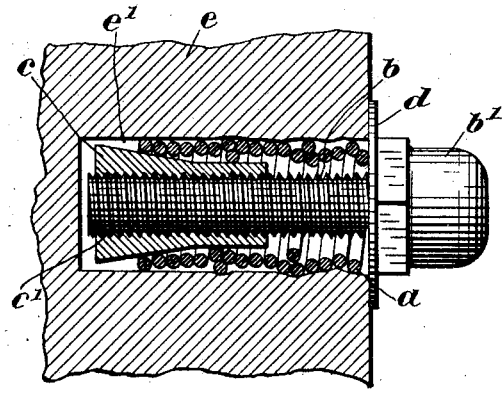
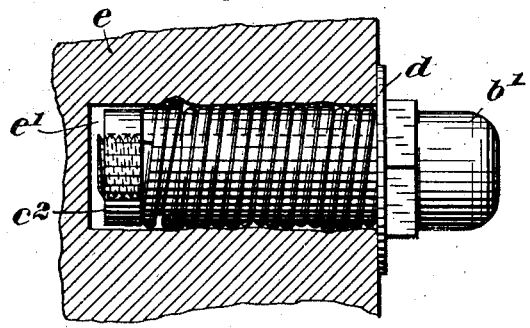
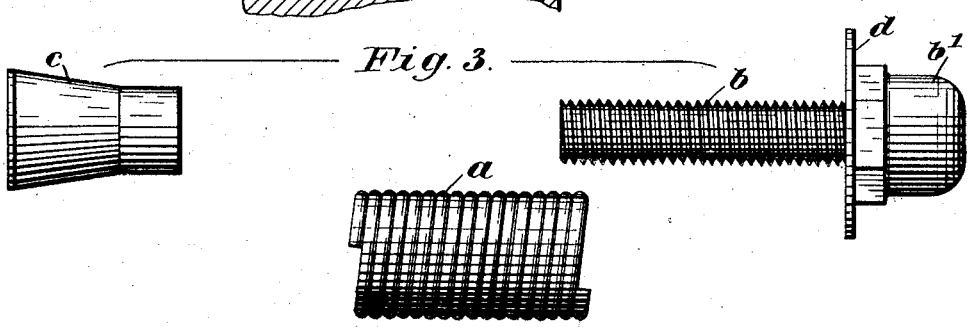
Witnesses:
Everitt S. Emery
Horace A. Crossman
Inventor:
Joel Jenkins.
by Emery, Booth & Varell
Attys No. 768,283.

Patented August 23, 1904.

UNITED STATES PATENT OFFICE.

JOEL JENKINS, OF MONTCLAIR, NEW JERSEY, ASSIGNOR TO JENKINS MANUFACTURING COMPANY, OF BLOOMFIELD, NEW JERSEY, A CORPORATION OF NEW JERSEY.

EXPANSION-BOLT.

SPECIFICATION forming part of Letters Patent No. 768,283, dated August 23, 1904.

Application filed December 7, 1903. Serial No. 184,049. (No model.)

*To all whom it may concern:*

Be it known that I, JOEL JENKINS, a citizen of the United States, and a resident of Montclair, in the county of Essex and State of New Jersey, have invented an Improvement in Expansion-Bolts, of which the following description, in connection with the accompanying drawings, is a specification, like letters on the drawings representing like parts.

My invention relates to improvements in expansible bolts, which are employed in various connections, such as securing bolts in brick or stone surfaces or in fastening casters to furniture.

The character and scope of the invention will be best understood from a description of one specific embodiment thereof.

In the drawings, which show the particular embodiment of the invention which I have selected for illustration, Figure 1 is an elevation of the device. Fig. 2 is a longitudinal section thereof in position in a wall or other surface. Fig. 3 is a detail view of the parts of the device. Fig. 4 shows in elevation a modification thereof.

Expansion devices or bolts of the character hereinafter described are generally employed in connection with walls or surfaces of brick, stone, or other material, in which it is ordinarily impossible or inexpedient to cut an aperture or a screw-thread to secure the bolt in position, and therefore it is necessary to provide some friction-holding means to securely anchor the bolt in a socket which has been previously formed in the material of the wall or other surface. As usually constructed such expansion devices consist of a short split sleeve or tube of suitable metal, such as brass, which is interposed between the head and a tapered nut on the extremities of the bolt to be secured. The greatest diameter of the tapered nut is made approximately equal to that of the socket, so that when the bolt is turned up or tightened the split end of the sleeve is caused to expand upon the tapered face of the nut and to bind between the nut and the wall of the socket. The objection to this construction is that the binding or holding effect is substantially confined to the extremity of the expansible sleeve, which is engaged between the nut and the wall of the socket. Hence the greater portion of the holding-sleeve contributes nothing directly to the holding or anchoring function. To overcome this defect and at the same time to greatly lessen the cost of production, I have devised an improved expansible member consisting of a sleeve formed, preferably, of spirally-coiled material, such as wire, or a flat metal strip $a$ of suitable length to extend between the head $b'$ of the bolt $b$ and the nut $c$ on the threaded extremity thereof. The nut $c$ is provided with a central bore $c'$ and with a tapering perimeter, as shown. A washer $d$ may be interposed beneath the head $b'$ of the bolt $b$.

When the parts are assembled and before the bolt $b$ is turned up to any considerable extent in its nut $c$, the device is inserted in a socket $e'$, formed for its reception in a wall or other surface $e$. Upon turning up the bolt the sleeve $a$ is compressed lengthwise between the head $b'$ and the nut $c$, whereupon it is flared or expanded by the tapering face of the nut until it firmly engages the side wall of the socket $e$. Upon further turning up of the bolt the coils or sections of the spiral sleeve tend to ride one upon another or to buckle, and thereby firmly engage the walls of the socket at numerous points intermediate of its extremities. Furthermore, if any indentations or irregularities exist in the walls of the socket this buckling of the sleeve causes the coils or sections thereof to be projected into or behind such irregularities, thus adding very materially to the holding or anchoring power of the device.

In the modification illustrated in Fig. 4 the structure is shown as provided with a nut $c^2$ of equal diameter throughout its length and the expansible sleeve as abutting squarely against the front face of the nut. In this form of the device there will obviously be no expanding effect due to the shape of the nut; but the intermediate buckling and riding up of the coils of the sleeve one upon the other will be fully as effective for holding purposes as in the preferred form illustrated in Figs. 1 to 3.

Many changes may be made in the details and in the relative arrangement of the parts of the invention without altering the character or scope thereof.

Having described my invention, what I claim as new, and desire to secure by Letters Patent, is—

An expansion-bolt comprising a headed shank, a nut and a sleeve of resilient round coiled wire interposed between said head and nut.

In testimony whereof I have signed my name to this specification in the presence of two subscribing witnesses.

JOEL JENKINS.

Witnesses:
  NATHAN RUSSELL,
  E. D. FARMER.